(12) United States Patent
Tsirkin

(10) Patent No.: US 9,396,286 B2
(45) Date of Patent: Jul. 19, 2016

(54) LOOKUP WITH KEY SEQUENCE SKIP FOR RADIX TREES

(71) Applicant: Red Hat Israel, Ltd., Ra'anana (IL)

(72) Inventor: Michael Tsirkin, Ra'anana (IL)

(73) Assignee: Red Hat Israel, Ltd., Ra'anana (IL)

( * ) Notice: Subject to any disclaimer, the term of this patent is extended or adjusted under 35 U.S.C. 154(b) by 247 days.

(21) Appl. No.: 14/272,445

(22) Filed: May 7, 2014

(65) Prior Publication Data

US 2015/0324485 A1    Nov. 12, 2015

(51) Int. Cl.
*G06F 17/30* (2006.01)

(52) U.S. Cl.
CPC .... *G06F 17/30961* (2013.01); *G06F 17/30864* (2013.01)

(58) Field of Classification Search
CPC ....................................................... G06F 17/30
USPC ................................................. 707/600–899
See application file for complete search history.

(56) References Cited

U.S. PATENT DOCUMENTS

| 5,946,679 | A | 8/1999 | Ahuja et al. |
| 6,067,574 | A | 5/2000 | Tzeng |
| 6,594,655 | B2 | 7/2003 | Tal et al. |
| 6,662,184 | B1 * | 12/2003 | Friedberg .......... G06F 17/30625 707/754 |
| 7,031,320 | B2 | 4/2006 | Choe |
| 7,062,499 | B2 | 6/2006 | Nehru et al. |

FOREIGN PATENT DOCUMENTS

WO    WO 2009078028 A1    6/2009

OTHER PUBLICATIONS

Viktor Leis et al., The Adaptive Radix Tree: ARTful Indexing for Main-Memory Databases, retrieved on May 6, 2014 from http://www-kemper.informatik.tu-muenchen.de/~leis/papers/ART.pdf; 12 pages.
Arne Andersson et al., Efficient Implementation of Suffix Trees, Department of Computer Science, Software-Practice and Experience, 1995, 25(2):129-141.
Roberto Grossi et al. Compressed Suffix Arrays and Suffix Trees with Applications to Text Indexing and String Matching, retrieved on May 6, 2014 from https://kuscholarworks.ku.edu/dspace/bitstream/1808/7177/1/vitter_2005.pdf, pp. 378-407, SIAM J. Comput. vol. 35, No. 2, © 2005 Society for Industrial and Applied Mathematics.
Suffix Trees, retrieved on May 6, 2014 from http://www.cs.ucf.edu/~shzhang/Combio11/lec3.pdf, 55 pages.
L. Allison, Patricia, retrieved on May 7, 2014 from http://www.csse.monash.edu.au/~lloyd/tildeAlgDS/Tree/Patricia/, 3 pages, 1999 © L.A. School of Computer Science and Software Engineering, Monash University, Australia 3168.
Richard Harter, Unordered Radix Trees, http://richardhartersworld.com/cri/2007/urtree.html—Author has passed away. We cannot locate this NPL, but attach the attempt through the "Wayback" Machine and also Richard Harter's death announcement.

* cited by examiner

*Primary Examiner* — Isaac M Woo
(74) *Attorney, Agent, or Firm* — Haynes and Boone, LLP

(57) ABSTRACT

Systems and methods are disclosed for determining whether a key is stored in a radix tree. An example system includes a traverser that identifies a container including a sequence of elements. The system also includes a match module that identifies, based on a number of skipped elements in a key, a chunk of the key. The match module determines whether the chunk matches the prefix included in the traversed container. The system further includes a skipping module that when the chunk of the key is determined to match the prefix, skips a number of elements after the chunk in the key. When the chunk of the key is determined to match the prefix, the traverser traverses one or more immediate child containers of the identified container and the search module identifies, based on the number of skipped elements, the chunk of the key.

20 Claims, 7 Drawing Sheets

US 9,396,286 B2

LOOKUP WITH KEY SEQUENCE SKIP FOR RADIX TREES

BACKGROUND

The present disclosure generally relates to a radix tree, and more particularly to determining whether a key is stored in a radix tree.

A radix tree is a data structure that is used to store data. A radix tree may be useful for constructing associative arrays with keys that can be expressed as strings and typically supports insertion, deletion, and search operations. The insertion operation adds a new string to the radix tree while trying to minimize the amount of data stored. The deletion operation removes a string from the radix tree. A search operation may include an exact lookup of a string, a lookup of a predecessor or successor of the string, or a lookup of all strings with a particular prefix.

BRIEF SUMMARY

This disclosure relates to determining whether a key is stored in a radix tree. Methods, systems, and techniques for determining whether a key is stored in a radix tree are provided.

According to an embodiment, a method of determining whether a key is stored in a radix tree includes identifying a first chunk of a key. The method also includes traversing a radix tree including a plurality of containers. The method further includes identifying, based on the traversing, a container including a first sequence of elements. The first sequence of elements has a first prefix. The method also includes determining whether the first chunk matches the first prefix. The method further includes when the first chunk is determined to match the first prefix, skipping a first number of elements after the first chunk in the key. The method also includes when the first chunk is determined to match the first prefix, for one or more traversed child containers of the identified container: identifying, based on the traversing, a first child container of the identified container, the first child container including a second sequence of elements, and the second sequence of elements having a second prefix; determining whether a second chunk of the key matches the second prefix, the second chunk of the key being a third sequence of elements after the skipped number of elements in the key; when the second chunk is determined to match the second prefix, traversing a second child container, the second child container being a child of the first child container; and skipping a second number of elements after the second chunk in the key.

According to another embodiment, a system for determining whether a key is stored in a radix tree includes a traverser that traverses a radix tree including a plurality of containers. The traverser identifies, based on the traversal, a container including a first sequence of elements. The first sequence of elements has a prefix. The system also includes a match module that identifies, based on a number of skipped elements in a key, a chunk of the key. The match module also determines whether the chunk matches the prefix included in the traversed container. The chunk includes a second sequence of elements. The system further includes a skipping module that when the chunk of the key is determined to match the prefix, skips a number of elements after the chunk in the key. When the chunk of the key is determined to match the prefix, the traverser traverses one or more immediate child containers of the identified container and the search module identifies, based on the number of skipped elements, the chunk of the key.

According to another embodiment, a non-transitory machine-readable medium includes a plurality of machine-readable instructions that when executed by one or more processors are adapted to cause the one or more processors to perform a method including: identifying a first chunk of a key; traversing a radix tree including a plurality of containers; identifying, based on the traversing, a container including a first sequence of elements, the first sequence of elements having a first prefix; determining whether the first chunk matches the first prefix; when the first chunk is determined to match the first prefix: skipping a first number of elements after the first chunk in the key; for one or more traversed child containers of the identified container: identifying, based on the traversing, a first child container of the identified container, the first child container including a second sequence of elements, and the second sequence of elements having a second prefix; determining whether a second chunk of the key matches the second prefix, the second chunk of the key being a third sequence of elements after the skipped number of elements in the key; when the second chunk is determined to match the second prefix, traversing a second child container, the second child container being a child of the first child container; and skipping a second number of elements after the second chunk in the key.

BRIEF DESCRIPTION OF THE DRAWINGS

The accompanying drawings, which form a part of the specification, illustrate embodiments of the invention and together with the description, further serve to explain the principles of the embodiments. Embodiments of the present disclosure and their advantages are best understood by referring to the detailed description that follows. In the drawings, like reference numbers may indicate identical or functionally similar elements. The drawing in which an element first appears is generally indicated by the left-most digit in the corresponding reference number.

DETAILED DESCRIPTION

Figure 1:
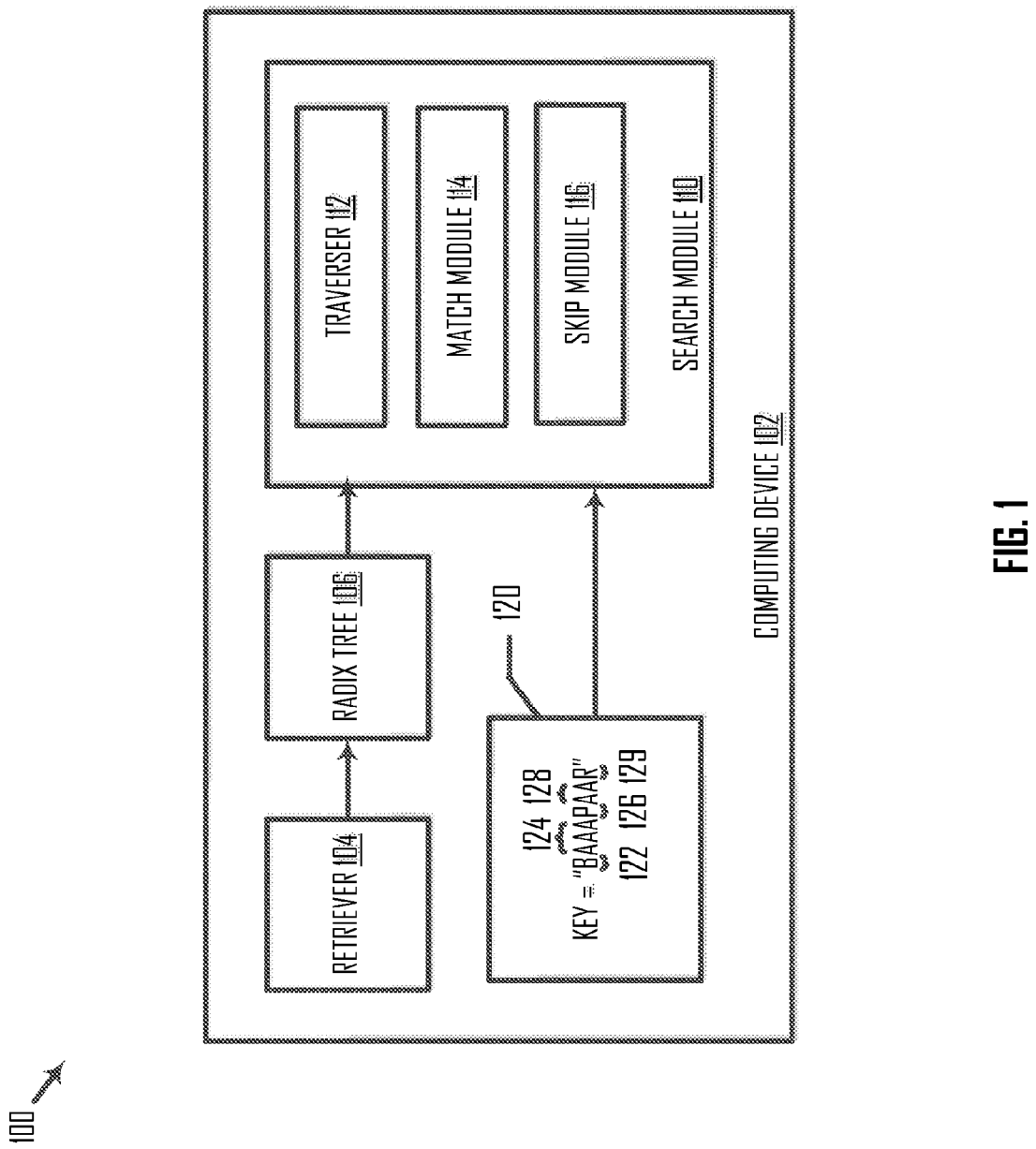
FIG. 1 is a block diagram illustrating a system for determining whether a key is stored in a radix tree, according to an embodiment.

I. Overview
II. Example System Architecture
  A. Example Radix Tree
  B. Traverse the Radix Tree
III. Search the Radix Tree for a Key
  A. Compare a First Chunk in the Key to a Plurality of Container Prefixes 1. The First Chunk in the Key Does Not Match One or More Container Prefixes
2. The First Chunk in the Key Matches a Container Prefix
   i. Leaf Container
   ii. The Key Includes More Elements to Compare to a Container Prefix
B. Compare another Chunk in the Key to another Plurality of Container Prefixes
   1. Skip a Number of Elements in the Key
   2. Identify the Other Chunk in the Key
   3. Traverse a Child Container Including a Prefix
C. Indicate Whether the Key is Stored in the Radix Tree
IV. An Example Radix Tree
V. Example Methods
VI. Example Computing System I. Overview It is to be understood that the following disclosure provides many different embodiments, or examples, for implementing different features of the present disclosure. Some embodiments may be practiced without some or all of these specific details. Specific examples of components, modules, and arrangements are described below to simplify the present disclosure. These are, of course, merely examples and are not intended to be limiting. Additionally, each of the examples may be combined with other examples that are disclosed in the following disclosure.

A binary tree may store one or more keys. In an example, if the binary tree stores a key that starts with 100 "0"s, the binary tree may have a depth of 100, stretching down to 100 levels. After the first 100 levels, the path may branch out. It may be time consuming to traverse the binary tree following a single path for 100 levels. A radix tree may offer advantages over a binary tree. For example, rather than store a single bit in a container a radix tree may store a sequence of elements in a single container.

Keys stored in the radix tree may have different lengths. To implement such a radix tree, memory to store the radix tree may be dynamically allocated or may be pre-allocated to ensure that sufficient memory is available to store the longest possible key for each container. Dynamically allocating memory and pre-allocating memory for a radix tree may have performance issues.

Further, it may be desirable to perform a quick search on a radix tree to determine whether a particular key is stored in the radix tree. Each container in a radix tree may include a plurality of elements. It may be desirable to minimize the time it takes to search the radix tree. The present disclosure provides techniques to reduce the time it takes to search the radix tree for a key. In an example, the time it takes to perform a search operation for a key in the radix tree is reduced by minimizing the number of elements that is compared when comparing sequences of elements included in the container to a sequence of elements in the key. For example, one or more elements in the key may be skipped.

It may be possible to skip one or more elements in the key because it is not important that the exact key be found and returned. In an example, a hypervisor may allow multiple operating systems, called guests, to run on the same physical system by offering virtualized hardware to the guest. The radix tree may store addresses to which the guest has access, and the key may be a sequence of bits that represents an address in memory that the guest is attempting to access. If the guest sends a request to determine whether the key is stored in the radix tree and receives a message indicating that the key is stored in the radix tree (and thus has access to the address), the guest may attempt to access the memory that is associated with the key. If it turns out that the guest does not actually have access to the key (it is not actually stored in the radix tree), the hypervisor may recognize that the guest is attempting to access an address to which it does not have rights to and crash the guest. Thus, it may be unimportant that the key is not actually stored in the radix tree when providing an indication that it is because a mechanism exists to prevent an action from occurring based on the false information. For example, the hypervisor may crash the guest or send an error message to the guest, which is not allowed to access memory addresses outside of the addresses stored in the radix tree.

Unless specifically stated otherwise, as apparent from the following discussion, it is appreciated that throughout the description, discussions utilizing terms such as "receiving", "identifying", "traversing", "determining", "skipping", "storing", "deleting", and "removing", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

II. Example System Architecture

FIG. 1 is a block diagram 100 illustrating a system for determining whether a key is stored in a radix tree, according to an embodiment. Diagram 100 includes a computing device 102. Computing device 102 may be a workstation, computer, server, game console, set-top box, kiosk, embedded system, mobile device (e.g., a mobile phone, personal digital assistant, tablet, and laptop), or other device having at least one processor and memory.

FIG. 1 also includes a retriever 104 and a search module 110. Each of retriever 104 and search module 110 is executable on computing device 102. Retriever 104 or search module 110 may receive an instruction to determine whether a key 120 is stored in a radix tree 106. A radix tree includes one or more containers and stores one or more keys. Radix tree 106 includes a plurality of containers, and each container may have zero or more children. In an example, radix tree 106 is a compressed radix tree and includes containers that have either zero children or a plurality of children. An example of a compressed radix tree is described in U.S. patent application Ser. No. 14/272,439 to Tsirkin et al., filed May 7, 2014 published as U.S. Patent Publication No. 2015/0324384 on Nov. 12, 2015, entitled "Offline Generation of Compressed Radix Tree with Key Sequence Skip," which is incorporated herein by reference in its entirely.

A node has a one-to-one relationship with an incoming edge, and the container may be a node or an edge of the radix tree. A key includes a sequence of elements. An element may be, for example, a symbol, character, letter, number, or bit. Other elements are within the scope of the disclosure. The key may map to a value that is referenced by a leaf container in the radix tree. In an example, a key is a sequence of bits that represents an address in memory. In such an example, the key may represent an address supplied in an instruction (e.g., input/output (I/O) address for a port I/O or a physical memory address for memory I/O) that maps to a "target" that indicates the instruction type. In another example, a key is a word including a sequence of letters. In such an example, the radix tree may be used to index words in a text document.

Retriever 104 may retrieve radix tree 106 from memory and search module 110 may search the radix tree for one or more keys. Search module 110 traverses radix tree 106 and determines whether key 120 "BAAAPAAR" is stored in radix tree 120.

A. Example Radix Tree

Figure 2:
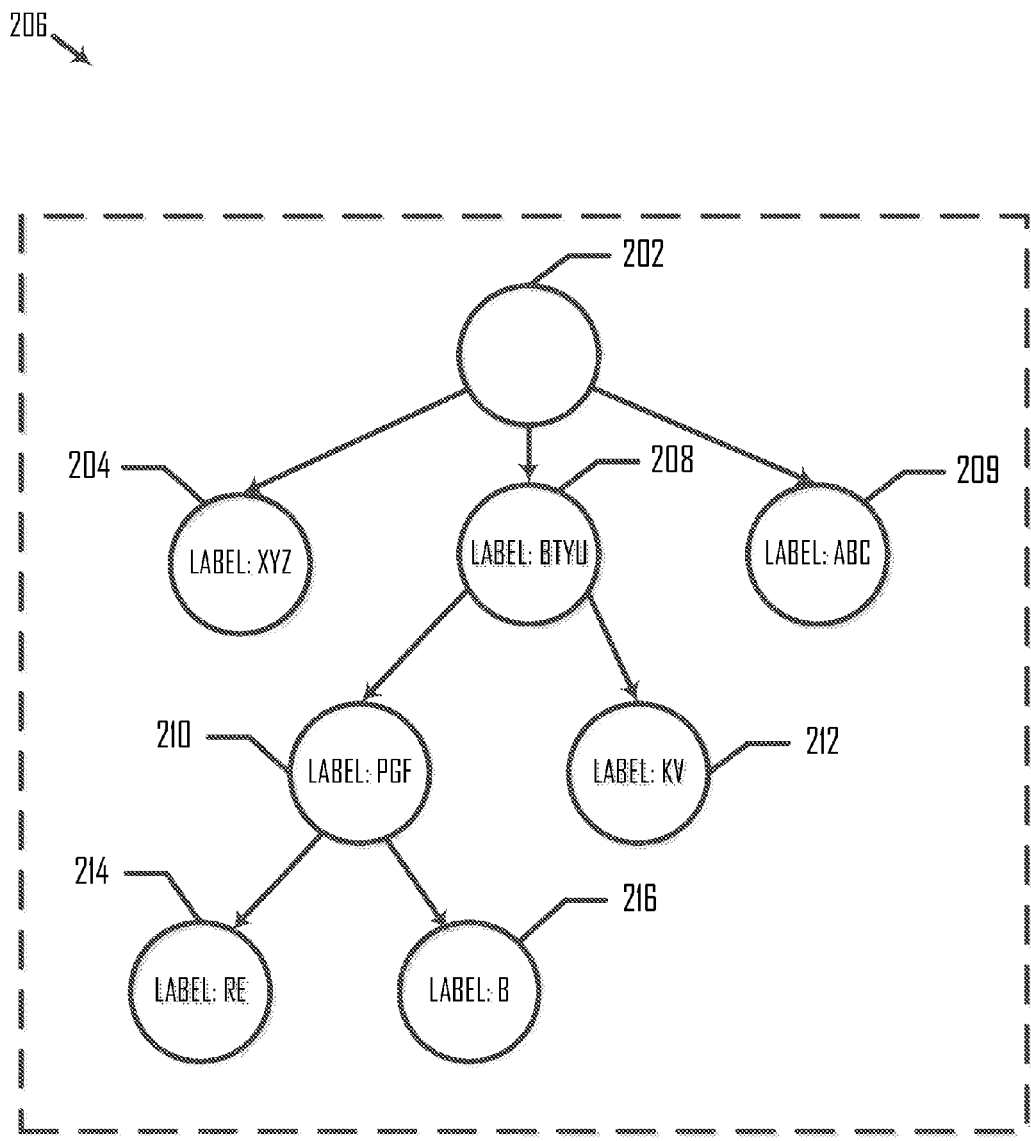
FIG. 2 is a block diagram illustrating a radix tree including a plurality of containers, according to an embodiment.

FIG. 2 is a block diagram illustrating a radix tree 206 including a plurality of containers, according to an embodiment. In FIG. 2, radix tree 206 includes one or more containers and stores one or more keys. In an example, radix tree 206 may be a compressed radix tree in which each container has zero or a plurality of children.

Each container may have a label field that has as its value a sequence of elements. The sequence of elements included in a container may be set as the container's label field. The sequence of elements may include a prefix and a remainder sequence. A prefix of a sequence of elements may refer to one or more beginning elements in the sequence of elements. A prefix of a container's label may be referred to as the container's prefix. A remainder sequence of a first sequence of elements may refer to a second sequence of elements that is after the prefix in the first sequence of elements. The second sequence of elements is a subset of the first sequence of elements. A remainder sequence of a container's label may be referred to as the container's remainder sequence. A container may also have a length field that has as its value a length of the remainder sequence included in the container.

Radix tree 206 includes a root container 202 that is at a depth of zero in radix tree 206. Root container 202 has three immediate children, containers 204, 208, and 209. As illustrated in FIG. 2, container 204 includes the sequence of elements "XYZ", container 208 includes the sequence of elements "BTYU", and container 209 includes the sequence of elements "ABC". Containers 204, 208, and 209 are at a depth of one in radix tree 206. An immediate child container of a parent container refers to a direct edge relationship between two containers. The immediate child may be located one depth level below the parent container. Containers 204, 208, and 209 are immediate children of root container 202. For example, a single edge connects root container 202 to container 204, which is one depth level below root container 202. In contrast, although a container 210 is a descendant of root node 202, container 210 is not an immediate child container of root node 202. A single edge does not connect root container 202 to container 210, which is more than one depth level below root container 202. An immediate child of a container is also a descendant of that container.

Container 208 has two immediate children, child containers 210 and 212. Container 210 includes the sequence of elements "PGF", and container 212 includes the sequence of elements "KV". Containers 210 and 212 are at a depth of two in radix tree 206. Container 210 has two immediate children, child containers 214 and 216. Container 214 includes the sequence of elements "RE", and container 216 includes the sequence of elements "B". Containers 214 and 216 are at a depth of three in radix tree 206. Containers 204, 209, 212, 214 and 216 are leaf containers because they have no children.

Each container in the radix tree may include a sequence of one or more elements that make up part of a key. Radix tree 206 may store five keys. In an example, a first key "XYZ" is stored in containers 202 and 204. Container 204 may map to a value that is associated with the first key (not shown). A second key "BTYUPGFRE" is stored in containers 202, 208, 210, and 214. Container 214 may map to a value that is associated with the second key (not shown). A third key "BTYUPGFB" is stored in containers 202, 208, 210, and 216. Container 216 may map to a value that is associated with the third key (not shown). A fourth key "BTYUKV" is stored in containers 202, 208, and 212. Container 212 may map to a value that is associated with the fourth key (not shown). A fifth key "ABC" is stored in containers 202 and 209. Container 209 may map to a value that is associated with the fifth key (not shown).

B. Traverse the Radix Tree

Search module 110 includes a traverser 112, match module 114, and skipping module 116. When a lookup for a key in a radix tree occurs, traverser 112 may traverse the radix tree to search for the key. In an example, traverser 112 starts from the root container, which may or may not store the beginning sequence of elements of the key that is being searched for. In an example, if the sequence of elements stored in the root container matches a first chunk of the key, traverser 112 then looks at the root container's children to search for the next chunk in the searched-for key. A chunk includes a sequence of elements.

Traverser 112 may continue to traverse the radix tree until a leaf container is reached. If a leaf container is not reached, then the key is not stored in the radix tree. If a leaf container is reached, then the key may be stored in the radix tree. Traverser 112 may look in the leaf container to determine whether the sequence of elements stored in the leaf container matches a suffix chunk of the key. The suffix chunk of the key may include the last one or more sequence of elements in the key. If the sequence of elements included in the leaf container matches the suffix chunk of the key, the key may be stored in the radix tree. Additionally, a leaf container may be associated with a value to which the key is mapped. Traverser 112 may identify the value to which the key maps. In an example, the leaf container may include the value. In another example, the leaf container references or points to the value.

In FIG. 2, root container 202 has a plurality of child containers. To search for a key, traverser 112 may traverse root container 202 and then container 204, container 208 and/or container 209. A sequence of elements includes a prefix. A prefix of a sequence of elements may refer to one or more beginning elements in the sequence of elements. For example, container 204 may include a prefix "X", "XY", or "XYZ" of sequence of elements "XYZ" included in the container. In another example, container 208 may include a prefix "B", "BT", "BTY", or "BTYU" of sequence of elements "BTYU" included in container 208. In some examples, the prefix is the sequence of elements.

A container may also include a remainder sequence. A remainder sequence of a first sequence of elements may refer to a second sequence of elements that is after the prefix in the first sequence of elements. For example, if "A" is the prefix of the sequence of elements "ABC", then the remainder sequence is "BC", which is the sequence of elements after the prefix. In another example, if "AB" is the prefix of the sequence of elements "ABC", then the remainder sequence is "C", which is the sequence of elements after the prefix. In another example, if "ABC" is the prefix of the sequence of elements "ABC", then no remainder sequence exists or the remainder sequence is empty.

In an embodiment, traverser 112 traverses radix tree 206 container by container and identifies the sequence of elements included in the one or more traversed containers. Traverser 112 may traverse radix tree 206 from top (e.g., root node) to bottom (e.g., a leaf node). Traverser 112 may traverse radix tree 206 until all of the containers are traversed, until most containers are traversed, until a particular number of containers are traversed, and/or until containers at a particular depth have been traversed.

In an example, traverser 112 traverses the containers in radix tree 206 such that a parent of a given container is traversed before the given container is traversed. In an example, traverser 112 traverses root container 202 down to a child container of the root container and continues to traverse the descendants of that child container until a leaf container is traversed. In such an example, traverser 112 may traverse root container 202 and container 204 (a child of root container 202). If a container has more than one child, traverser 112 may traverse the other container's children. For example, after traversing container 204, traverser 112 may traverse container 208 (a child of root container 202) and any children that container 208 may have. For example, after traversing container 208, traverser 112 may traverse containers 210 and 212, which are immediate children of container 208 and also descendants of container 202.

In another example, traverser 112 starts at root container 202 at depth zero, goes down the next depth level and traverses each container at that depth level, and continues to go down one depth level at a time and traverse each container at that particular depth level before moving on to the next depth level. In such an example, traverser 112 may start at root container 202 at depth zero, traverse down to each of the containers at depth one (e.g., containers 204, 208, and 209), and traverse down to each of the containers at depth two (e.g., containers 210 and 212), and so on. Accordingly, containers having a smaller depth are traversed before containers having a larger depth in radix tree 206. In other words, containers that are located closer to the root container are traversed before containers that are located farther from the root container.

III. Search the Radix Tree for a Key

In the example illustrated in FIG. 2, each container in radix tree 206 includes a plurality of elements. It may be desirable to minimize the time it takes to search the radix tree. The present disclosure provides techniques to reduce the time it takes to search radix tree 206 for a key. In an example, the time it takes to search for a key in radix tree 206 is reduced by minimizing the number of elements that is compared when comparing sequences of elements that are included in a container. For example, parts of the key may be skipped during lookup, as will be discussed further below.

The description below will refer to FIGS. 1 and 2 together to explain in further detail how search module 110 searches radix tree 206 for key 120. Retriever 104 or search module 110 may receive an instruction to determine whether key 120 is stored in radix tree 206 (in FIG. 2).

A. Compare a First Chunk in the Key to a Plurality of Container Prefixes

Match module 114 identifies a chunk of a sequence of elements in key 120 up to a length threshold. The length threshold may be any whole number greater than zero. In an example, the length threshold is one, and match module 114 identifies a chunk 122 including a sequence of one or more elements in key 120 up to the length threshold. Chunk 122 is a prefix "B" of key 120 and has a length equal to one, which is the threshold length. The prefix "B" is the first element in chunk 122 as well as the first element in key 120. In another example, the length threshold is two, and match module 114 identifies a chunk including a sequence of elements in key 120 up to the length threshold. In such an example, the chunk may be a prefix "B" or prefix "BA" of key 120.

Traverser 112 identifies, based on traversing radix tree 206, container 204, which includes the sequence of elements "XYZ". Match module 114 may compare the identified chunk in key 120 (e.g., chunk "B" 122) to a prefix of the sequence of elements included in a traversed container. In an example, the length of the prefix of the sequence of elements is smaller than the length of the sequence of elements. Match module 114 identifies a prefix of the sequence of elements "XYZ" included in container 204 and compares the prefix to the identified chunk in key 120. The identified prefix has a length up to the length threshold. In keeping with the above example in which the length threshold is one, match module 114 may identify a prefix "X" of the sequence of elements "XYZ" included in container 204. The prefix "X" is the first element of the sequence of elements included in container 204 and has a length of one because the prefix has one element. The length of chunk "B" 122 is the same as the length of prefix "X" of container 204. Match module 114 may determine whether chunk "B" 122 of key 120 matches the prefix "X" of container 204. Chunk "B" 122 is different from the prefix "X" of container 204. Match module 114 compares chunk "B" 122 to prefix "X" of container 204 and determines that they do not match.

Search module 110 may continue to perform these actions until no prefixes included in the child containers of container 202 are determined to match the identified chunk of key 120 or until a leaf container is reached. For example, match module 114 may perform these actions on the one or more other immediate children of container 202 to determine whether chunk "B" 122 of key 120 matches any of the prefixes of the sequences of elements included in the one or more other immediate children of container 202, and continue to traverse the radix tree.

1. The First Chunk in the Key Does Not Match One or More Container Prefixes

Traverser 112 may also traverse containers 209 and 208. If the first chunk of key 120 is determined to not match any of the prefixes included in a set of containers, search module 110 may send a message indicating that the key is not stored in the radix tree to a client. In an example, the set of containers is container 202's plurality of children. In such an example, if chunk "B" 122 of key 120 is determined to not match any of the prefixes included in the immediate children of container 202 (e.g., container 204, 208, or 209), search module 110 may send a message indicating that the key is not stored in radix tree 206 to a client.

In the traversal of container 209, match module 114 may identify a prefix of the sequence of elements "ABC" included in container 209 and compare the prefix to the identified chunk in key 120. The identified prefix has a length up to the length threshold. In keeping with the above example in which the length threshold is one, match module 114 may identify a prefix "A" of the sequence of elements "ABC" included in container 209. The prefix "A" is the first element of the sequence of elements included in container 209 and has a length of one because the prefix has one element. The length of chunk "B" 122 is the same as the length of prefix "A" of container 209. Match module 114 may determine whether chunk "B" 122 of key 120 matches the prefix "A" of container 209. Chunk "B" 122 is different from the prefix "A" of container 204. Match module 114 compares chunk "B" 122 to prefix "A" of container 204 and determines that they do not match.

2. The First Chunk in the Key Matches a Container Prefix

Additionally, in the traversal of container 208, match module 114 may identify a prefix of the sequence of elements "BTYU" included in container 208 and compare the prefix to the identified chunk in key 120. The identified prefix has a length up to the length threshold. In keeping with the above example in which the length threshold is one, match module 114 may identify a prefix "B" of the sequence of elements "BTYU" included in container 208 and compare the prefix to the identified chunk in key 120. The prefix "B" is the first element of the sequence of elements included in container 208 and has a length of one because the prefix has one element. The length of chunk "B" 122 is the same as the length of prefix "B" of container 204. Match module 114 may determine whether chunk "B" 122 of key 120 matches the prefix "B" of container 208. Chunk "B" 122 is different from the prefix "B" of container 208. Match module 114 compares chunk "B" 122 to prefix "B" of container 208 and determines that they match.

i. Leaf Container

Match module 114 may determine whether the identified container that includes the matching prefix is a leaf container. If the identified container that includes the matching prefix is determined to be a leaf container and match module 114 determines that the first chunk of key 120 (e.g., "B") matches the prefix of the identified container, match module 114 may go on to compare a second chunk of key 120 to a sequence of elements included in a child container of the identified container. In an example, traverser 112 traverses an immediate child of the identified container.

Search module 110 may continue to traverse the containers of the radix tree and perform these actions until a leaf container is reached or until no prefixes included in the immediate child containers of the identified container are determined to match the identified chunk of key 120.

ii. The Key Includes More Elements to Compare to a Container Prefix

In an example, match module 114 may also ensure that the length of the remainder sequence of the key (e.g., after the identified chunk) is greater than the length of the sequence of elements included in the identified container. In an example, match module 114 determines a length of the remainder sequence in key 120, where the remainder sequence is after the first chunk of key 120. If chunk "B" 122 is the first chunk of key 120, the remainder sequence of key 120 may be "AAA-PAAR", which is the remaining sequence of elements after chunk "B" 122 in key 120 and has a length of seven.

Match module 114 may also determine the length of the remainder sequence included in the identified container. In an example, the identified container is container 208, which includes the prefix "B" and the remainder sequence "TYU". The length of container 208's prefix is one, and the length of container 208's remainder sequence is three. If the length of the remainder sequence in key 120 (e.g., seven) is greater than or equal to the length of the remainder sequence "TYU" included in container 208 (e.g., three), there is more of the key to compare and match module 114 may go on to traverse container 208's children.

B. Compare another Chunk in the Key to another Plurality of Container Prefixes

In an example, match module 114 compares a second chunk of key 120 to a sequence of elements included in a child container of the identified container. The child container of the identified container may be an immediate child of the identified container (e.g., container 208). The second chunk of key 120 is sequentially after the first chunk in the key.

1. Skip a Number of Elements in the Key

To identify the second chunk, skipping module 116 may skip a number of elements after the first chunk in the key and determine a length of the remainder sequence included in the identified container. The number of elements skipped in the key may be equal to the length of the remainder sequence included in the identified container. In an example, the identified container is container 208. Container 208 includes the prefix "B" and the remainder sequence "TYU", where the prefix has a length of one and the remainder sequence has a length of three. In such an example, skipping module 116 may skip a sequence of three elements 124 in key 120 (see FIG. 1). Sequence of elements 124 has a length of three and includes the three elements "AAA" in key 120. Sequence of elements 124 is a sequence of elements that is sequentially after chunk "B" 122 in key 120 and is adjacent to chunk "B" 122. In particular, the last element of chunk "B" 122 is adjacent to the first element in sequence of elements 124.

2. Identify the Other Chunk in the Key

Match module 114 identifies the second chunk of key 120 where skipping module 116 leaves off, where a length of the second chunk is less than or equal to a length threshold. The length threshold may be the same as or different from a length threshold that is previously used. In an example, the length threshold may be depend on, for example, how much memory the radix tree consumes, a maximum number of elements allowed in a container, or a depth of the container in the radix tree. These are merely examples, and other factors may be used to determine the length threshold. In keeping with the above example in which the length threshold is one, match module 114 may identify a second chunk 126 in key 120 and compare the chunk to a prefix of an immediate child of container 208, which has a prefix that matches the first chunk "B" 122 of key 120. Chunk "P" 126 has a length of one and includes the element "P". Chunk "P" 126 is a sequence of elements after the skipped number of elements in key 120 and is adjacent to the last element in sequence of elements 124.

3. Traverse a Child Container including a Prefix

Additionally, if match module 114 determines that the first chunk of key 120 (e.g., chunk "B" 122) matches the prefix of the identified container, traverser 112 traverses one or more children of the identified container. In an embodiment, for one or more traversed child containers of the identified container, traverser 112 identifies, based on traversing radix tree 206, a first child container of the identified container. The identified container may be the container including the prefix that matches the first chunk of the key. In an example, the identified container is container 208, and the first child container is an immediate child container of container 208. For example, traverser 112 may traverse container 212 and/or container 210, which are immediate children of container 208.

In an example, traverser 112 traverses container 212, which includes the sequence of elements "KV". Match module 114 may identify a prefix of the sequence of elements "KV" included in container 212 and compare the prefix to chunk "P" 126, the identified chunk in key 120. The identified prefix has a length up to the length threshold. In keeping with the above example in which the length threshold is one, match module 114 may identify a prefix "K" of the sequence of elements "KV" included in container 212. The prefix "K" is the first element of the sequence of elements included in container 212 and has a length of one because the prefix has one element. The length of chunk "P" 126 is the same as the length of prefix "K" of container 212. Match module 114 may determine whether chunk "P" 126 of key 120 matches the prefix "K" of container 212. Chunk "P" 126 is different from the prefix "K" of container 212. Match module 114 compares chunk "P" 126 to prefix "K" of container 212 and determines that they do not match.

Traverser 112 may traverse container 210, which includes the sequence of elements "PGF". Match module 114 may identify a prefix of the sequence of elements "PGF" included in container 210 and compare the prefix to chunk "P" 126 in key 120. The identified prefix has a length up to the length threshold. In keeping with the above example in which the length threshold is one, match module 114 may identify a prefix "P" of the sequence of elements "PGF" included in container 210. The prefix "P" is the first element of the sequence of elements included in container 210 and has a length of one because the prefix has one element. The length of chunk "P" 126 is the same as the length of prefix "P" of container 210. Match module 114 may determine whether chunk "P" 126 of key 120 matches the prefix "P" of container 212. Chunk "P" 126 is the same as the prefix "P" of container 212. Match module 114 compares chunk "P" 126 to prefix "P" of container 210 and determines that they match.

Match module 114 may determine whether the identified container that includes the matching prefix is a leaf container. If the identified container that includes the matching prefix is determined to be a leaf container and if match module 114 determines that chunk "P" 126 of key 120 matches the prefix of container 210, match module 114 may go on to compare a third chunk of key 120 to a sequence of elements included in a child container of container 210 (e.g., an immediate child of container 210). In an example, match module 114 may determine a length of the remainder sequence in key 120, where the remainder sequence is after second chunk "P" 126 of key 120. If chunk "P" 126 is the second chunk of key 120, the remainder sequence of key 120 may be "AAR", which is the remaining sequence of elements after chunk "P" 126 in key 120 and has a length of three.

Match module 114 may also determine the length of the remainder sequence included in container 210, which includes the prefix "P" and the remainder sequence "GF". The length of container 210's prefix is one, and the length of container 210's remainder sequence is two. If the length of the remainder sequence in key 120 (e.g., three) is greater than or equal to the length of the remainder sequence "GF" included in container 210 (e.g., two), match module 114 may go on to traverse container 210's children. In an example, match module 114 may go compare a third chunk of key 120 to a sequence of elements included in a child container of container 210 (e.g., immediate child of container 210). If, however, the length of the remainder sequence in key 120 is not greater than or equal to the length of the remainder sequence "GF" included in container 210, then traverser 112 may traverse the other children of container 208 and compare a prefix in the other child to the identified chunk.

The length of the remainder sequence "AAR" in key 120 (e.g., three) is greater than the length of the remainder sequence "GF" included in container 210. Accordingly, search module 110 may continue to traverse the containers of the radix tree and perform these actions until a leaf container is reached or until no prefixes included in the immediate child containers of the identified container are determined to match the identified chunk of key 120. If the second chunk of key 120 is determined to not match any of the prefixes included in any of container 210's immediate children, search module 110 may send a message indicating that the key is not stored in the radix tree to a client.

In keeping with the above, skip module 116 may determine that a length of the remainder sequence in container 210 is two, and skip a sequence of elements 128, which includes the two elements "AA" after chunk "P" 126. Match module 114 may identify a third chunk 129 in key 120 and compare the chunk to a prefix of an immediate child of container 210. Chunk "R" 129 has a length of one and includes the element "R". Chunk "R" 129 is a sequence of elements after the skipped number of elements in key 120 and is adjacent to the last element in sequence of elements 128. Traverser 112 may traverse container 216, which includes the sequence of elements "B", and compares chunk "R" 129 of key 120 to prefix "B" of container 216 and determines that they do not match. Traverser 112 may also traverse container 214, which includes the sequence of elements "RE", and compares chunk "R" 129 of key 120 to prefix "R" of container 214 and determines that they match.

Match module 114 may determine whether the identified container that includes the matching prefix is a leaf container. By the time traverser 112 traverses a leaf container, portions of the key were skipped and not compared to the sequences of elements included in one or more traversed containers. For example, a parent container may include a prefix of a sequence of elements. Although match module 114 may determine that the prefix matches an identified chunk in the key, which enables traverser 112 to traverse another container and match module 114 to compare the other container's prefix with another chunk in the key, the sequence of elements included in the parent may or may not actually match a portion in the key. Portions of the key are skipped and may or may not actually match the sequence of elements included in the container.

C. Indicate Whether the Key is Stored in the Radix Tree

When the identified container that includes the matching prefix is determined to be a leaf container, search module 110 may perform many different actions. In an example, search module 110 sends a message indicating that the key is stored in the radix tree to a client. In such an example, search module 110 may return a failure. The message may include the key to be searched for and/or the key that is stored in a set of containers, where the set of containers includes a prefix that was determined to match an identified chunk of the key. Additionally, the message may include the value to which the key is associated.

In an embodiment, when an identified container that includes the matching prefix is determined to be a leaf container, search module 110 may retrieve a key range for the leaf container. The key range may be stored as part of the leaf container or in another data structure. In an example, the key range for leaf container 214 may be ABDAAAAAA-BZZAAAAAA. If key 120 is within the key range of ABDAAAAAA-BZZAAAAAA, search module 110 sends a message indicating that the key is stored in the radix tree to a client. Additionally, if key 120 is within the key range, search module 110 may return key 120. If key 120 is not within the key range of ABDAAAAAA-BZZAAAAAA, search module 110 sends a message indicating that the key is not stored in the radix tree to a client. If key 120 is not within the key range, search module 110 may return a failure.

In another embodiment, when an identified container that includes the matching prefix is determined to be a leaf container, search module 110 may send a message indicating that the key is stored in the radix tree to a client. In such an example, rather than compare the sequence of elements included in the leaf container to a chunk in the key (e.g., the last chunk in the key), search module 110 may assume that the key is stored in the radix tree and send a message indicating that the key is stored in the radix tree to a client.

In another embodiment, when an identified container that includes the matching prefix is determined to be a leaf container, search module 110 compares the prefix of the sequence of elements included in the leaf container to the identified chunk of the key. In an example, when traverser 112 traverses container 214, match module 114 may compare sequence of elements "R" included in container 214 to chunk "R" 129 in key 120 and determine that they match. When the prefix of the sequence of elements included in the leaf container is determined match the identified chunk in the key, search module 110 may send a message indicating that the key is stored in the radix tree to a client. In contrast, when the prefix of the sequence of elements included in the leaf container is determined to not match the identified chunk in the key, search module 110 may send a message indicating that the key is not stored in the radix tree to a client.

In another embodiment, when an identified container that includes the matching prefix is determined to be a leaf container, search module 110 compares the sequence of elements included in the leaf container to the identified chunk of the key. In an example, when traverser 112 traverses container 214, match module 114 may compare sequence of elements "RE" included in container 214 to chunk "R" 129 in key 120 and determine that they do not match. When the sequence of elements included in the leaf container is determined to not match the identified chunk in the key, search module 110 may send a message indicating that the key is not stored in the radix tree to a client. In contrast, when the sequence of elements included in the leaf container is determined to match the identified chunk in the key, search module 110 may assume that the key is stored in the radix tree and send a message indicating that the key is stored in the radix tree to a client.

In another embodiment, when an identified container that includes the matching prefix is determined to be a leaf container, search module 110 determines a length of the identified chunk in the key and the length of the sequence of elements included in the leaf container. When the length of the identified chunk in the key is determined to be the same as the length of the sequence of elements included in the leaf container, search module 110 may send a message indicating that the key is stored in the radix tree to a client. In contrast, when the length of the identified chunk in the key is determined to not be the same as the length of the sequence of elements included in the leaf container, search module 110 may assume that the key is not stored in the radix tree and send a message indicating that the key is not stored in the radix tree to a client.

As discussed above and further emphasized here, FIGS. 1 and 2 are merely examples, which should not unduly limit the scope of the claims. For example, it should be understood that one or more modules may be combined with another module. In an example, traverser 112 may be combined with match module 114. In another example, skip module 116 may be combined with match module 114. It should also be understood that a module may be separated into more than one module. In an example, match module 114 may be separated into a first match module and a second match module.

IV. An Example Radix Tree

Figure 3:
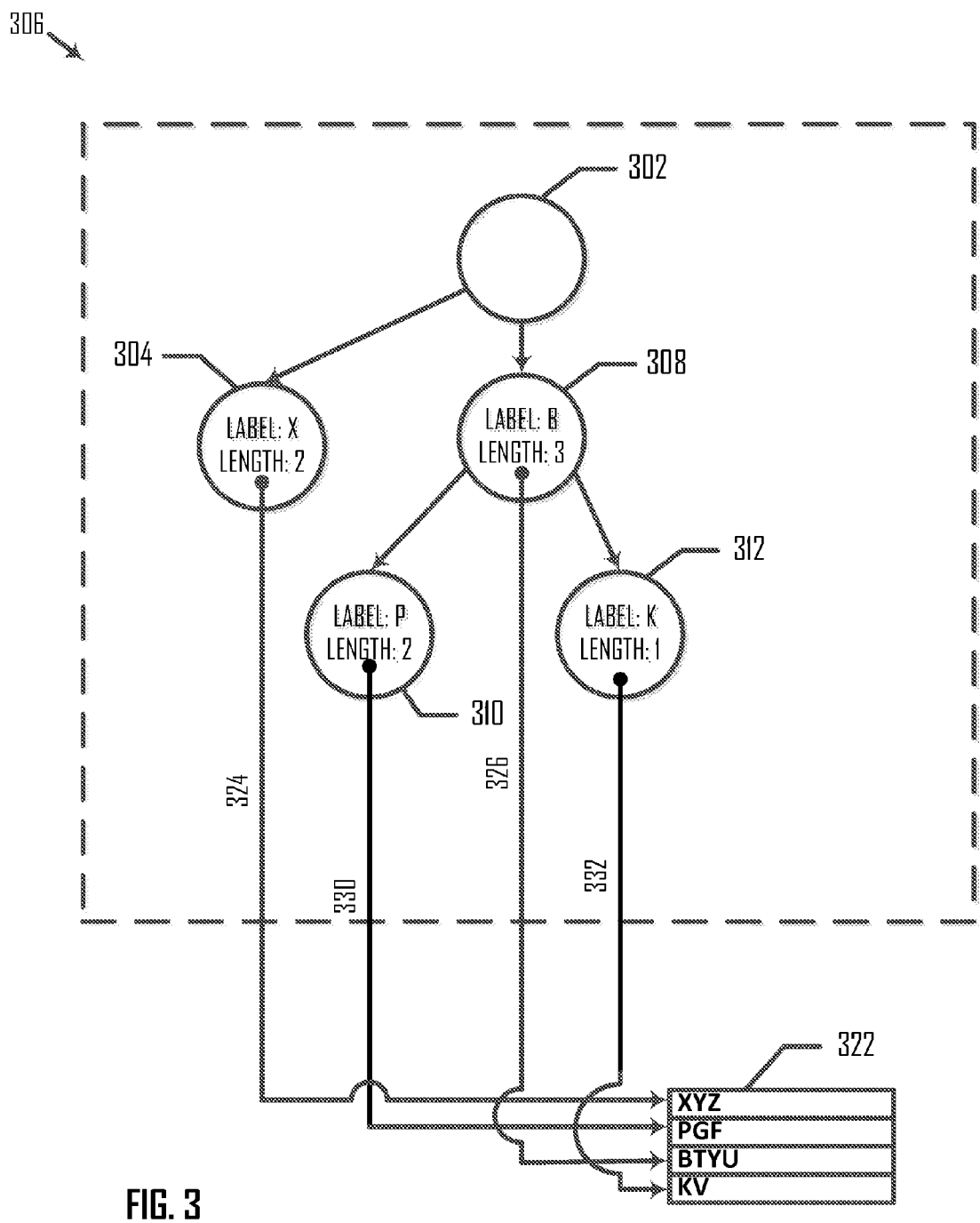
FIG. 3 is a block diagram illustrating a radix tree and an auxiliary data structure, according to an embodiment.

Additionally, the radix tree that search module 110 may search may be different from the radix tree illustrated in FIG. 2. FIG. 3 is a block diagram illustrating a radix tree 306 and an auxiliary data structure 322, according to an embodiment. It may be possible that even if the sequence of elements included in the leaf container of radix tree 206 match identified chunks in the searched-for key, the searched-for key may still not actually be stored in the radix tree.

Radix tree 306 includes a plurality of containers. A container in radix tree 306 may reference an entry in the auxiliary data structure, which may store one or more sequences of elements included in a container. The auxiliary data structure may be any data structure that is capable of storing a sequence of elements. The auxiliary data structure may be, for example, a table, array, binary tree, or other data structure.

In FIG. 3, a container may include a length field that has as its value a length of the remainder sequence in the container. Radix tree includes containers 302, 304, 308, 310, and 312. Container 304's label field has a value of "X" (e.g., the prefix of container 304 up to the length threshold) and container 304's length field has a value of two, which is the length of container 304's remainder sequence "XY". Container 304 has a reference to an entry in auxiliary data structure 322, where the entry stores the sequence of elements "XYZ" initially included in container 204. Container 308's label field has a value of "B" (e.g., the prefix of container 308 up to the length threshold) and container 308's length field has a value of three, which is the length of container 308's remainder sequence "BTYU". Container 308 has a reference to an entry in auxiliary data structure 322, where the entry stores the sequence of elements "BTYU" initially included in container 308.

Container 310's label field has a value of "P" (e.g., the prefix of container 310 up to the length threshold) and container 310's length field has a value of two, which is the length of container 310's remainder sequence "GF". Container 310 has a reference to an entry in auxiliary data structure 322, where the entry stores the sequence of elements "PGF" initially included in container 310. Container 312's label field has a value of "K" (e.g., the prefix of container 312 up to the length threshold) and container 312's length field has a value of one, which is the length of container 312's remainder sequence "KV". Container 312 has a reference to an entry in auxiliary data structure 322, where the entry stores the sequence of elements "KV" initially included in container 312.

Traverser 112, match module 114, and skip module 116 may traverse radix tree 306, determine whether a prefix of a container (e.g., label value) matches a chunk in a searched-for key, and skip elements in the key to identify a chunk in the searched-for key as described in the present disclosure. Additionally, in FIG. 3, auxiliary data structure 322 may store the actual keys stored in radix tree 306 such that when search module 110 arrives at a leaf container, match module 114 may access an entry in auxiliary data structure 322 and determine whether the sequence of elements stored at the entry match the searched-for key. In an example, match module 114 follows the reference to the entry in auxiliary data structure 322.

If the sequence of elements stored at the entry matches the searched-for key, search module 110 may send a message indicating that the key is stored in the radix tree to a client. In contrast, if the sequence of elements stored at the entry does not match the searched-for key, search module 110 may send a message indicating that the key is not stored in the radix tree to a client. The radix tree illustrated in FIG. 3 may be advantageous because radix tree 306 is small and stores a minimum number of elements per container. The remainder sequences are stored in auxiliary data structure 322.

Although auxiliary data structure 322 is illustrated as storing the entire sequence of elements included in a container, this is not intended to be limiting. In another example, auxiliary data structure 322 stores remainder sequences and search module 114 compares an identified chunk in the searched-for key to the remainder sequence stored in an entry of auxiliary data structure 322.

Additionally, although a portion of a sequence of elements included in a container has been described as being stored in auxiliary data structure 322, this is not intended to be limiting. In another example, an auxiliary data structure is not used and containers in the radix tree have a label field and a length field. Search module 110 may continue to search radix tree 306 without using auxiliary data structure 322.

Further, although a container is illustrated as including the length of the remainder sequence, this is not intended to be limiting. For example, in another embodiment, a container may include the length of the sequence of elements included in the container. In such an embodiment, search module 110 may subtract the length of the prefix from the length of the sequence of elements included in the container to determine the length of the remainder sequence. In another embodiment, a container may also include the length of the prefix identified in the container.

Additionally, although the elements have been illustrated in FIGS. 2-3 as being letters, it should be understood that this is not intended to be limiting. Other embodiments in which an element is different from a letter is within the scope of the disclosure. For example, one or more containers may include bits or other symbols.

V. Example Methods

Figure 4:
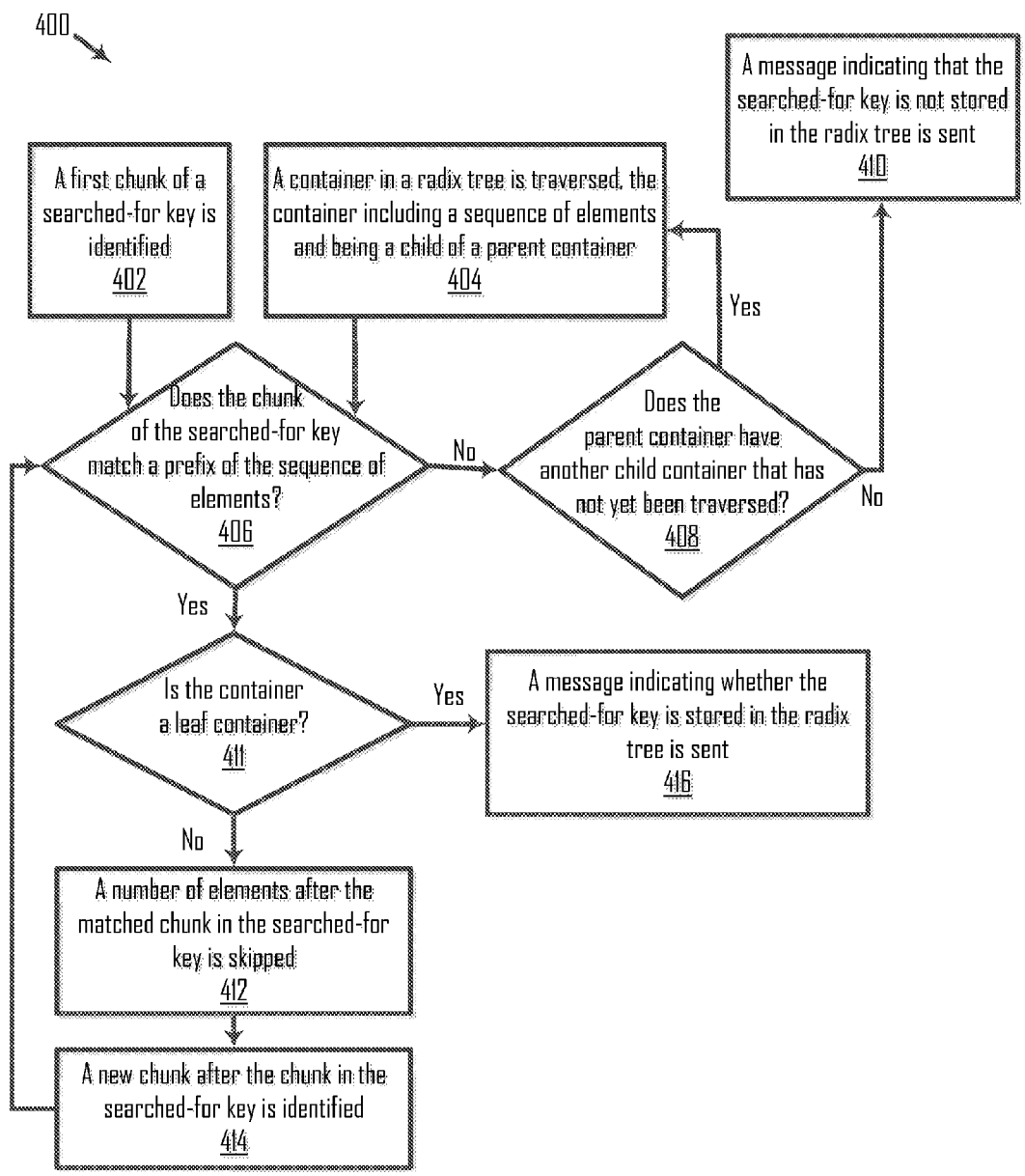
FIG. 4 is a flowchart illustrating a method of determining whether a key is stored in the radix tree, according to an embodiment.

FIG. 4 is a flowchart illustrating a method 400 of determining whether a key is stored in a radix tree, according to an embodiment. Method 400 is not meant to be limiting and may be used in other applications.

Method 400 includes actions 402-416. In an action 402, a first chunk of a searched-for key is identified. In an example, match module 114 identifies the first chunk of the searched-for key. In an action 404, a container in a radix tree is traversed, the container including a sequence of elements and being a child of a parent container. In an example, traverser 112 traverses container 208 in radix tree 206, container 208 including a sequence of elements and being a child of parent container 202.

In an action 406, it is determined whether the chunk of the searched-for key matches a prefix of the sequence of elements. In an action 408, when the chunk of the searched-for key is determined to not match the prefix of the sequence of elements, it is determined whether the parent container has another child container that has not yet been traversed. In an action 410, when the parent container is determined to not have another child container that has not yet been traversed, a message is sent indicating that the searched-for key is not stored in the radix tree. When the parent container is determined to have another child container that has not yet been traversed, process flow proceeds back to action 404, where another container in the radix tree is traversed, the other container including a sequence of elements and being a child of the parent container.

In an action 411, when the chunk of the searched-for key is determined to match the prefix of the sequence of elements, it is determined whether the container is a leaf container. In an action 412, when the container is determined to not be a leaf container, a number of elements after the chunk in the searched-for key is skipped. In an action 414, a new chunk after the matched chunk in the searched-for key is identified, and process flow then proceeds back to action 406, where it is determined whether the new chunk of the searched-for key matches a prefix of the sequence of elements. The prefix that is compared to the new chunk of the searched-for key is different from the prefix that is compared to the first chunk. In an action 416, when the container is determined to be a leaf container, a message indicating whether the searched-for key is stored in the radix tree is sent.

It is also understood that additional processes may be performed before, during, or after actions 402-416 discussed above. It is also understood that one or more of the actions of method 400 described herein may be omitted, combined, or performed in a different sequence as desired. In an example, actions 402-416 may be applied to one or more (or all) containers at each depth level of the radix tree.

Figure 5A:
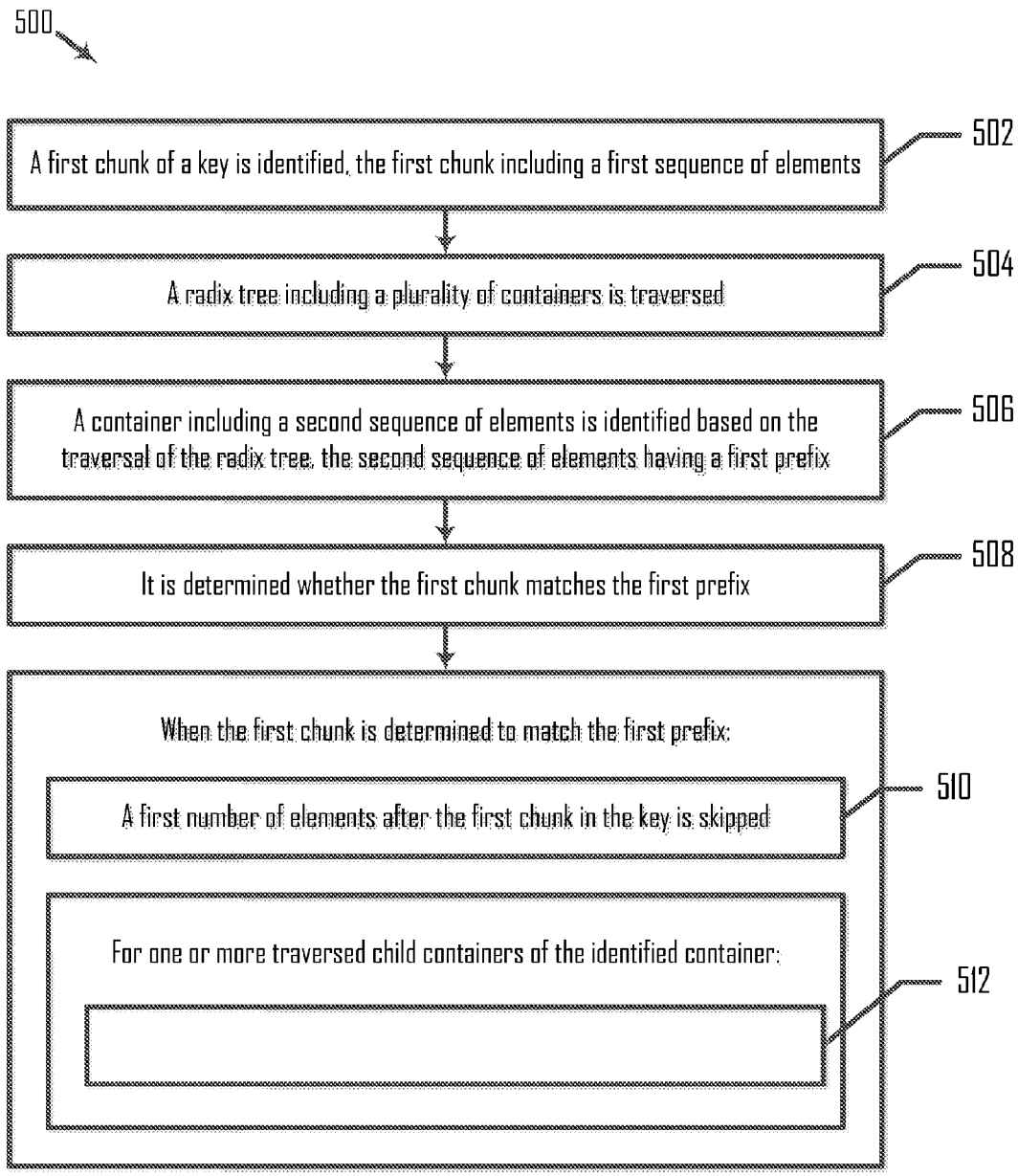
FIGS. 5A and 5B is a flowchart illustrating another method of determining whether a key is stored in a radix tree, according to an embodiment.
Figure 5B:
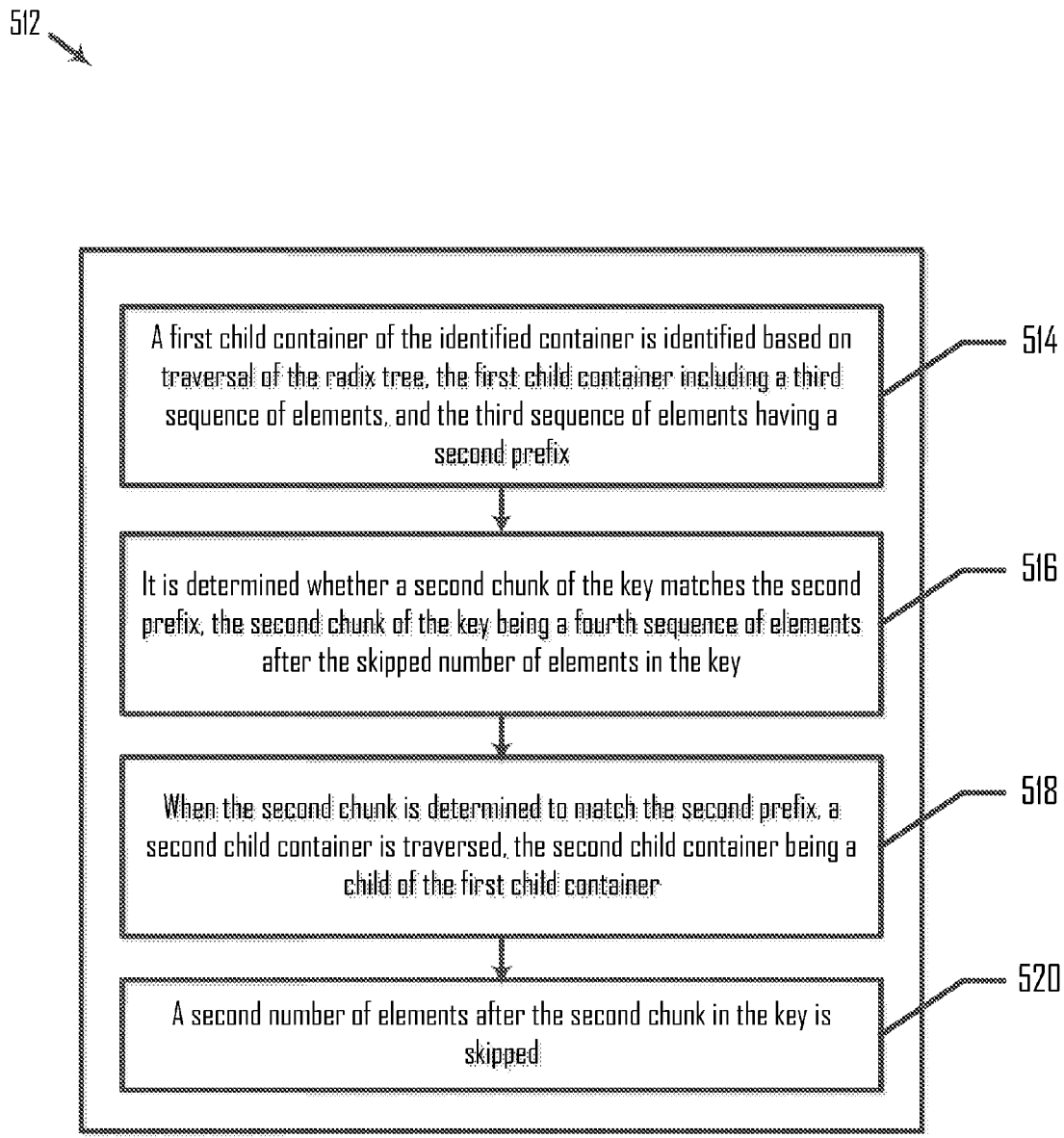

FIGS. 5A and 5B is a flowchart illustrating a method 500 of determining whether a key is stored in a radix tree, according to an embodiment. Method 500 is not meant to be limiting and may be used in other applications.

Method 500 includes actions 502-520. In an action 502, a first chunk of a key is identified, the first chunk including a first sequence of elements. In an example, match module 114 identifies a chunk "B" 122 of key "BAAAPAAR" 120. In an action 504, a radix tree including a plurality of containers is traversed. In an example, traverser 112 traverses radix tree 206 including a plurality of containers. Each of the containers of the plurality of containers may include a plurality of elements. In an action 506, a container including a second sequence of elements is identified based on traversal of radix tree 206, the second sequence of elements having a first prefix. In an example, match module 114 identifies, based on the traversal of radix tree 206, container 208 including a second sequence of elements "BTYU", the second sequence of elements having a first prefix "B".

In an action 508, it is determined whether the first chunk matches the first prefix. In an example, match module 114 determines whether chunk "B" 122 matches first prefix "B". When the first chunk is determined to match the first prefix, actions 510 and 512 are performed. In an action 510, a first number of elements after the first chunk in the key is skipped. In an example, skipping module 116 skips a first number of elements after the first chunk in the key. The first number of elements may be equal to a length of the remainder sequence included in container 208. For example, the length of the remainder sequence "TYU" included in container 208 is three. As such, skipping module may skip three elements after chunk "B" 122 in key 120.

For one or more traversed child containers of the identified container, action 512 is performed. Action 512 includes actions 514-520. In an action 514, a first child container of the identified container is identified based on traversal of the radix tree, the first child container including a third sequence of elements, and the third sequence of elements having a second prefix. In an example, match module 114 identifies, based on traversal of radix tree 206, child container 210 of container 208, container 210 including a third sequence of elements "PGF", and the third sequence of elements having a second prefix "P". In an action 516, it is determined whether a second chunk of the key matches the second prefix, the second chunk of the key being a fourth sequence of elements after the skipped number of elements in the key. In an example, match module 114 determines whether chunk "P" 126 of key 120 matches the second prefix "P", chunk "P" 126 of key 120 being a fourth sequence of elements after the three skipped elements in key 120. In an action 518, when the second chunk is determined to match the second prefix, a second child container is traversed, the second child container being a child of the first child container. In an example, when chunk "P" 126 is determined to match the second prefix "P", traverser 112 traverses container 214, which is a child of container 210. In an action 520, a second number of elements after the second chunk in the key is skipped. In an example, skipping module 126 skips a second number of elements after the second chunk in key 120.

VI. Example Computing System

Figure 6:
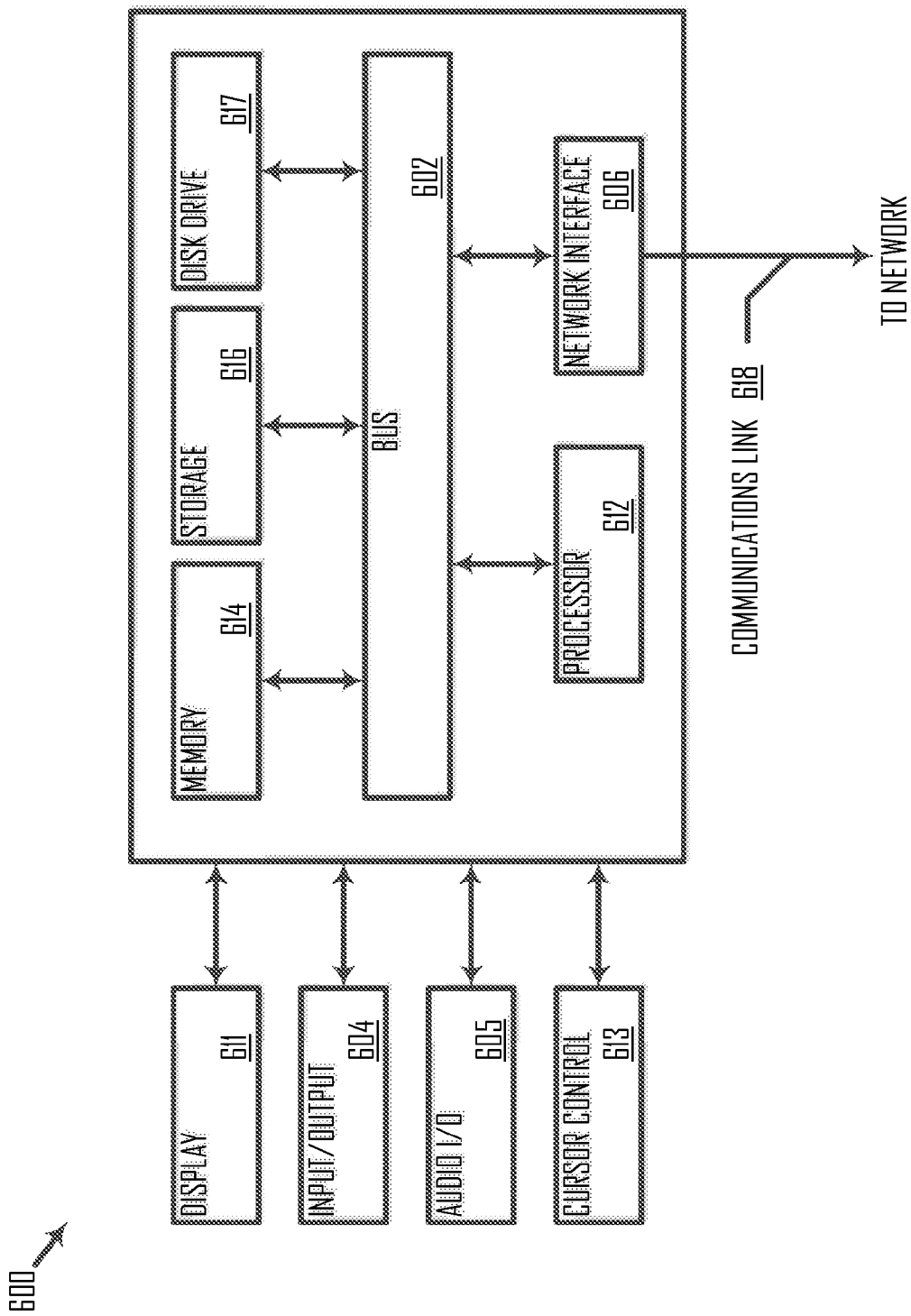
FIG. 6 is a block diagram of an electronic system suitable for implementing one or more embodiments of the present disclosure.

FIG. 6 is a block diagram of a computer system 600 suitable for implementing one or more embodiments of the present disclosure. In various implementations, computing device 102 may include a client or a server computing device that includes one or more processors and may additionally include one or more storage devices each selected from a group including a floppy disk, flexible disk, hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read. The one or more storage devices may include stored information that may be made available to one or more computing devices and/or computer programs (e.g., clients) coupled to the client or server using a computer network (not shown). The computer network may be any type of network including a LAN, a WAN, an intranet, the Internet, a cloud, and/or any combination of networks thereof that is capable of interconnecting computing devices and/or computer programs in the system.

Computer system 600 includes a bus 602 or other communication mechanism for communicating information data, signals, and information between various components of computer system 600. Components include an input/output (I/O) component 604 that processes a user action, such as selecting keys from a keypad/keyboard, selecting one or more buttons or links, etc., and sends a corresponding signal to bus 602. I/O component 604 may also include an output component such as a display 611, and an input control such as a cursor control 613 (such as a keyboard, keypad, mouse, etc.). An optional audio input/output component 605 may also be included to allow a user to use voice for inputting information by converting audio signals into information signals. Audio I/O component 605 may allow the user to hear audio. A transceiver or network interface 606 transmits and receives signals between computer system 600 and other devices via a communication link 618 to a network. In an embodiment, the transmission is wireless, although other transmission mediums and methods may also be suitable. A processor 612, which may be a micro-controller, digital signal processor (DSP), or other processing component, processes these various signals, such as for display on computer system 600 or transmission to other devices via communication link 618. Processor 612 may also control transmission of information, such as cookies or IP addresses, to other devices.

Components of computer system 600 also include a system memory component 614 (e.g., RAM), a static storage component 616 (e.g., ROM), and/or a disk drive 617. Computer system 600 performs specific operations by processor 612 and other components by executing one or more sequences of instructions contained in system memory component 614. Logic may be encoded in a computer readable medium, which may refer to any medium that participates in providing instructions to processor 612 for execution. Such a medium may take many forms, including but not limited to, non-volatile media, volatile media, and transmission media. In various implementations, non-volatile media includes optical, or magnetic disks, or solid-state drives, volatile media includes dynamic memory, such as system memory component 614, and transmission media includes coaxial cables, copper wire, and fiber optics, including wires that include bus 602. In an embodiment, the logic is encoded in non-transitory computer readable medium. In an example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences (e.g., method 400 and/or method 500) to practice the present disclosure may be performed by computer system 600. In various other embodiments of the present disclosure, a plurality of computer systems 600 coupled by communication link 618 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also where applicable, the various hardware components and/or software components set forth herein may be combined into composite components including software, hardware, and/or both without departing from the spirit of the present disclosure. Where applicable, the various hardware components and/or software components set forth herein may be separated into sub-components including software, hardware, or both without departing from the spirit of the present disclosure. In addition, where applicable, it is contemplated that software components may be implemented as hardware components, and vice-versa.

Application software in accordance with the present disclosure may be stored on one or more computer readable mediums. It is also contemplated that the application software identified herein may be implemented using one or more specific purpose computers and/or computer systems, networked and/or otherwise. Where applicable, the ordering of various actions described herein may be changed, combined into composite actions, and/or separated into sub-actions to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Changes may be made in form and detail without departing from the scope of the present disclosure. Thus, the present disclosure is limited only by the claims.

I claim:

1. A method of determining whether a key is stored in a radix tree, comprising:
    identifying a first chunk of a key;
    traversing a radix tree including a plurality of containers;
    identifying, based on the traversing, a container including a first sequence of elements, the first sequence of elements having a first prefix;
    determining whether the first chunk matches the first prefix;
    when the first chunk is determined to match the first prefix:
        skipping a first number of elements after the first chunk in the key;
        for one or more traversed child containers of the identified container:
            identifying, based on the traversing, a first child container of the identified container, the first child container including a second sequence of elements, and the second sequence of elements having a second prefix;
            determining whether a second chunk of the key matches the second prefix, the second chunk of the key being a third sequence of elements after the skipped number of elements in the key;
            when the second chunk is determined to match the second prefix, traversing a second child container, the second child container being a child of the first child container; and
            skipping a second number of elements after the second chunk in the key.

2. The method of claim 1, further including:
when the first chunk is determined to not match any of the prefixes included in a set of containers, sending a message indicating that the key is not stored in the radix tree.

3. The method of claim 1, wherein the first chunk is a prefix of the key.

4. The method of claim 1, wherein the first chunk includes a fourth sequence of elements and is the first element of the fourth sequence of elements, and the second prefix is the first element of the first sequence of elements.

5. The method of claim 1, further including:
receiving an instruction to determine whether the key is stored in the radix tree.

6. The method of claim 1, further including:
when the second chunk is determined to not match the second prefix, sending a message indicating that the key is not stored in the radix tree.

7. The method of claim 1, further including:
when the first chunk is determined to match the first prefix, determining a length of the remainder sequence included in the identified container, the first number of elements being the length of the remainder sequence.

8. The method of claim 7, further including:
when the first chunk is determined to match the first prefix, determining a length of a remainder sequence in the key, the remainder sequence being a sequence of one or more elements after the first chunk in the key, wherein the skipping a first number of elements, the identifying a first child container, the determining whether a second chunk of the key matches the second prefix, the traversing a second child container, and the skipping a second number of elements includes when the length of the remainder sequence in the key is greater than the length of the remainder sequence included in the container, skipping the first number of elements, identifying the first child container, determining whether the second chunk of the key matches the second prefix, traversing the second child container, and skipping the second number of elements.

9. The method of claim 1, further including:
when the second chunk is determined to match the second prefix, determining a length of the remainder sequence included in the first child container, the second number of elements being the length of the remainder sequence.

10. The method of claim 1, wherein the identifying a first child container of the identified container includes identifying an immediate child container of the identified container, and wherein the traversing a second child container includes traversing an immediate child container of the first child container, and wherein a length of the first prefix of the first sequence of elements is the length threshold.

11. The method of claim 1, wherein the second chunk is determined to match the second prefix, the method further including:
determining whether the first immediate child container is a leaf container, wherein the traversing a second immediate child container includes when the first immediate child container is determined to not be a leaf container, traversing the second immediate child container; and
when the first immediate child container is determined to be a leaf container, sending a message indicating that the key is stored in the radix tree.

12. The method of claim 11, wherein the first immediate child container is determined to be a leaf container, the method further including:
determining a key range for the leaf container;
determining whether the key falls within the key range, wherein the sending a message indicating that the key is stored in the radix tree includes when the key is determined to fall within the key range, sending the message indicating that the key is stored in the radix tree; and
when the key is determined to not fall within the key range, sending a message indicating that the key is not stored in the radix tree.

13. The method of claim 11, further including:
when the first immediate child container is determined to be a leaf container, sending a value stored in the leaf container.

14. A system for determining whether a key is stored in a radix tree, comprising:
a traverser that traverses a radix tree including a plurality of containers and identifies, based on the traversal, a container including a first sequence of elements, the first sequence of elements having a prefix;
a match module that identifies, based on a number of skipped elements in a key, a chunk of the key and determines whether the chunk matches the prefix included in the traversed container, wherein the chunk includes a second sequence of elements; and
a skipping module that when the chunk of the key is determined to match the prefix, skips a number of elements after the chunk in the key,
wherein when the chunk of the key is determined to match the prefix, the traverser traverses one or more immediate child containers of the identified container and the search module identifies, based on the number of skipped elements, the chunk of the key.

15. The system of claim 14, wherein the first chunk is a prefix of the key.

16. The system of claim 14, wherein when a first chunk is determined to match a first prefix included in a container, the match module determines whether the identified container is a leaf container, wherein when the identified container is determined to be a leaf container, the match module accesses an auxiliary data structure to determine whether the key is stored in the auxiliary data structure, and wherein when the key is determined to be stored in the auxiliary data structure the match module sends a message indicating that the key is stored in the radix tree, and when the key is determined to not be stored in the auxiliary data structure the match module sends a message indicating that the key is not stored in the radix tree.

17. The system of claim 14, wherein when the second chunk is determined to not match the second prefix, the match module sends a message indicating that the key is not stored in the radix tree.

18. The system of claim 14, wherein when the first chunk is determined to match the first prefix, the skipping module determines a length of a remainder sequence included in the identified container, wherein the number of elements is the length of the remainder sequence of the identified container.

19. The system of claim 14, wherein for one or more traversed child containers of the identified container, the traverser identifies a first child container of the identified container, the first child container includes a third sequence of elements, and the third sequence of elements has a second prefix, wherein the match module determines whether a second chunk of the key matches the second prefix, the second chunk of the key is a fourth sequence of elements after the skipped number of elements in the key, wherein when the second chunk is determined to match the second prefix, the traverser traverses a second child container, the second child container is a child of the first child container, and wherein the skipping module skips a second number of elements after the second chunk in the key.

20. A non-transitory machine-readable medium comprising a plurality of machine-readable instructions that when executed by one or more processors is adapted to cause the one or more processors to perform a method comprising:
   identifying a first chunk of a key;
   traversing a radix tree including a plurality of containers;
   identifying, based on the traversing, a container including a first sequence of elements, the first sequence of elements having a first prefix;
   determining whether the first chunk matches the first prefix;
   when the first chunk is determined to match the first prefix:
      skipping a first number of elements after the first chunk in the key;
      for one or more traversed child containers of the identified container:
         identifying, based on the traversing, a first child container of the identified container, the first child container including a second sequence of elements, and the second sequence of elements having a second prefix;
         determining whether a second chunk of the key matches the second prefix, the second chunk of the key being a third sequence of elements after the skipped number of elements in the key;
         when the second chunk is determined to match the second prefix, traversing a second child container, the second child container being a child of the first child container; and
         skipping a second number of elements after the second chunk in the key.

* * * * *